(12) United States Patent
Kramer et al.

(10) Patent No.: US 6,216,485 B1
(45) Date of Patent: Apr. 17, 2001

(54) DEVICE FOR COOLING EXTRUDED PROFILES

(75) Inventors: Carl Kramer; Markus Becker, both of Aachen (DE)

(73) Assignee: Ingenieurgemeinschaft Wsp Prof. Dr. Ing. Carl Kramer, Prof. H.J. Gerhardt M.SC., Aachen (DE)

( * ) Notice: Subject to any disclaimer, the term of this patent is extended or adjusted under 35 U.S.C. 154(b) by 0 days.

(21) Appl. No.: 09/308,871

(22) PCT Filed: Nov. 27, 1997

(86) PCT No.: PCT/EP97/06605

§ 371 Date: May 26, 1999

§ 102(e) Date: May 26, 1999

(87) PCT Pub. No.: WO98/23397

PCT Pub. Date: Jun. 4, 1998

(30) Foreign Application Priority Data

Nov. 28, 1996 (DE) ................................................ 196 49 073

(51) Int. Cl.[7] ............................ F25D 17/02; F25D 25/04; B21C 29/00; C21B 7/22; B21D 37/16
(52) U.S. Cl. .............................. 62/374; 62/380; 266/114; 72/342.2
(58) Field of Search ............................... 62/374, 375, 378, 62/380; 266/113, 114; 72/201, 342.2

(56) References Cited

U.S. PATENT DOCUMENTS

| | | | |
|---|---|---|---|
| 3,997,376 | * 12/1976 | Hemsath et al. | 148/143 |
| 4,407,487 | * 10/1983 | Wang | 266/114 |
| 4,611,789 | 9/1986 | Ackert et al. | . |
| 5,327,763 | * 7/1994 | Kramer et al. | 72/257 |
| 5,413,314 | * 5/1995 | Plata et al. | 266/113 |
| 5,458,485 | * 10/1995 | Righetti | 432/78 |
| 5,595,632 | * 1/1997 | Macierewicz | 162/277 |

FOREIGN PATENT DOCUMENTS

| | | |
|---|---|---|
| 15 83 418 | 1/1972 | (DE) . |
| 195 00 019 | 7/1996 | (DE) . |
| 88 10 085 U | 10/1998 | (DE) . |
| 0 541 630 | 5/1993 | (EP) . |
| 0 578 607 | 1/1994 | (EP) . |

* cited by examiner

Primary Examiner—William Doerrler
(74) Attorney, Agent, or Firm—Renner, Otto, Boisselle & Sklar LLP

(57) ABSTRACT

The invention relates to a device for cooling extruded profiles (2) comprising slotted air nozzles (6U, 6O) arranged above and below the extruded profile moving on an exit runway (1) and oriented transversely to the direction of movement of the profile, and water impingement nozzles (12) for impinging the extruded profile with water, wherein the water impingement nozzles are arranged separately from the slotted air nozzles (6U, 6O) in tubes (12) oriented in the direction of movement of the profile such that the impingement portions of the individual water impingement nozzles (12) supplement to achieve a homogenous impingement of the extruded profile (2).

15 Claims, 2 Drawing Sheets

DEVICE FOR COOLING EXTRUDED PROFILES

Figure 1:
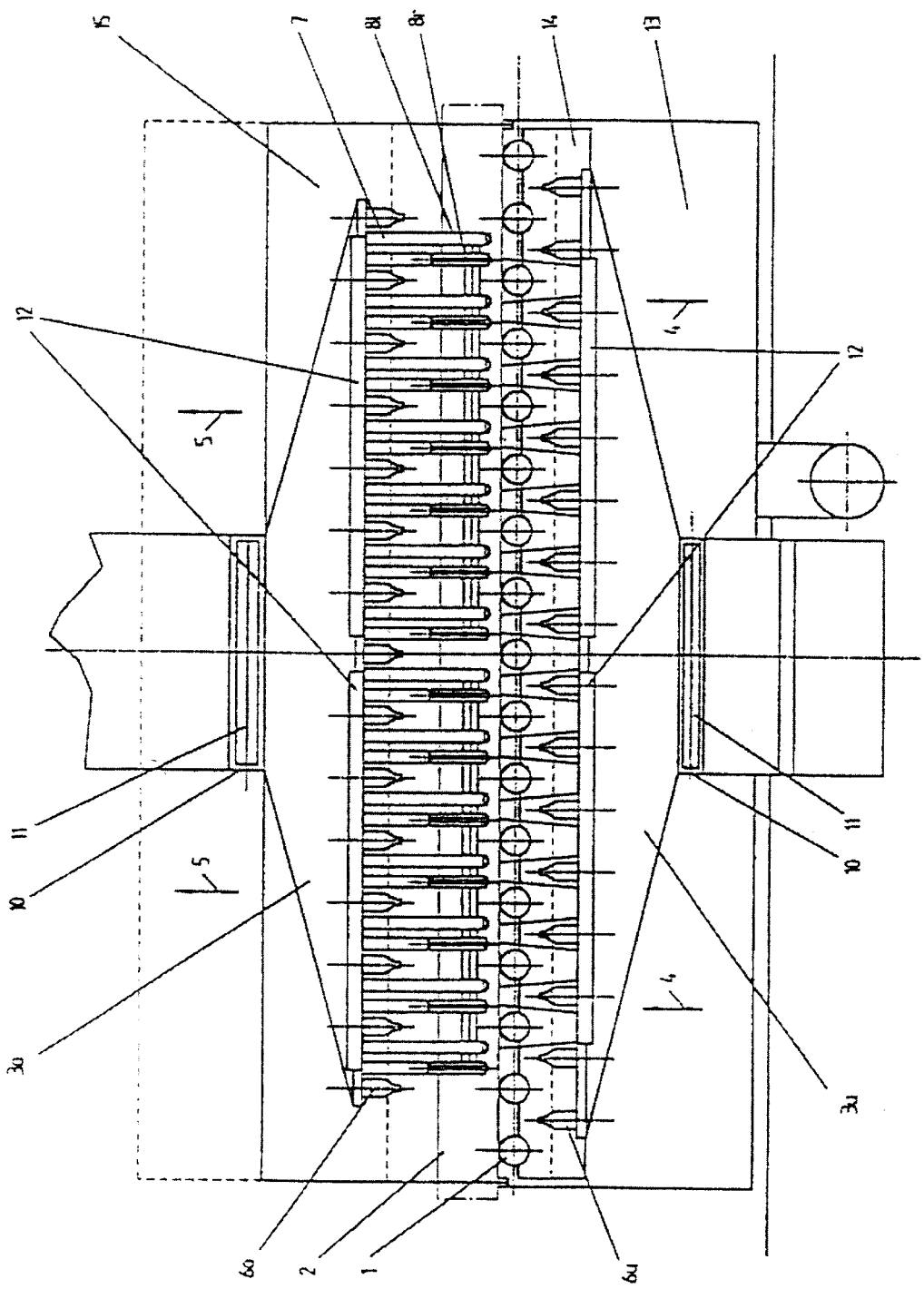

The invention relates to a device for cooling extruded profiles or sections on leaving an extruder, the device including slotted nozzles arranged above, below and for high extruded profiles also on the side of the extruded profiles for jetting it with air as well as water nozzles arranged likewise above, below and on the side of the extruded profiles for impinging it with water, it being optionally possible with this device to employ air or water for cooling.

Extruded profiles or sections need to be cooled on leaving the die. This is necessary in the case of sections of light metal alloy for material-technical reasons to attain the desired strength values and metallurgical properties in the finished-cooled extruded profile. In the case of AlMgSi alloys the necessary cooling rates are achievable only with intensive water impingement of the surface of the profile where greater wall thicknesses are concerned. Where a lesser wall thickness is concerned, however, the quenching effect with water cooling is so strong that distortion occurs in the finish-cooled profile which, if at all, can only be compensated by complicated straightening techniques and heavy strain on the profile which when associated with yielding involves a disadvantageous change in the metallurgical properties.

Known from EP 0 541 630 is a device for cooling extruded profiles in which slotted air nozzles are arranged only above and below the section. This device has the disadvantage that when profiles having a considerable overall height are extruded the side surface areas fail to be sufficiently jetted and as a result the cooling fails to be consistent over the full periphery of such profiles. By the teaching of the aforementioned patent the heat transfer may be varied over the width of the profile by adjustment elements provided in the nozzle body. This is a disadvantage since these adjustment elements are arranged in a relatively large flow cross-section, namely the inflow cross-section to the banks of nozzles and accordingly the free through-flow cross-section needs to be reduced to a relatively highly restricted cross-section to achieve any appreciable change in the heat transfer at all.

In addition, the adjustment means as taught by the aforementioned patent is relatively complicated since it needs to cover the complete area of the nozzle area. Likewise in accordance with the teaching of this patent water nozzles are arranged in the air nozzles. These water nozzles can only be operated appropriately when at the same time air jetting is activated. This has the big disadvantage that a high flow of air is charged with water and consequently involving considerable complications in ensuring that the water droplets contained in the air stream are subsequently removed therefrom.

Another disadvantage is that the water nozzles can be operated only with relatively small water impingement densities since otherwise the air flow is no longer able to affect the necessary uniformity in water impingement. However, for cooling extruded portions of medium to large wall thickness water impingement densities of 500 liters (m²min) to 1,000 liters (m²min) are needed, these being values which are far from achievable by the known device. Yet another, deciding drawback is that the water nozzles in accordance with the teaching of this patent are arranged parallel to the slotted nozzles, i.e. only one row of nozzles oriented transversely to the direction of extrusion may be shut off as a whole or changed in pressure at any one time. For adapting the cooling effect to the distribution of the masses and wall thicknesses in the section as necessary such a device is not suitable.

The object of the present invention is to get around the disadvantages as cited above. This object is achieved by the characterizing features as they read from claim 1, the sub-claims defining preferred embodiments of the invention.

More particularly, the present invention proposes an apparatus for cooling extruded profiles which is particularly suitable for extruded profiles of light metal alloys and which permits the necessary high cooling rates for both low and high profile wall thicknesses by cooling profiles of low wall thickness only with air and profiles of high wall thickness only with water, whilst nevertheless practically excluding any bending or distortion of the profiles during cooling since both air cooling and water cooling can be adapted to the wall thickness and mass distribution of the profile.

One major advantage as compared to other devices for cooling extruded profiles is also that this novel apparatus covers the complete range of the heat transfer from air cooling to harsh water cooling. For extruded profiles of light metal alloys this range corresponds to a scope of the mean heat transfer coefficient of approx. 100 W/(m²K) to approx. 6,000 W/(m²K) for the temperature range of approx. 500° C. to approx. 250° C. which is important metallurgically, i.e. a range of roughly 1 to 60. In this arrangement cooling is done with air in the range of 100 W/(m²K) to approx. 300 W/(m²K), and with water when even higher. Since in the cited temperature range for light metal alloys water cooling takes place above the so-called Leidenfrost temperature, heat transfer depends substantially on the water impingement density. The apparatus in accordance with the invention thus excels by the fact that the water impingement density can be varied in the necessary scope without altering the uniformity of the water impingement to disadvantage.

Figure 2:
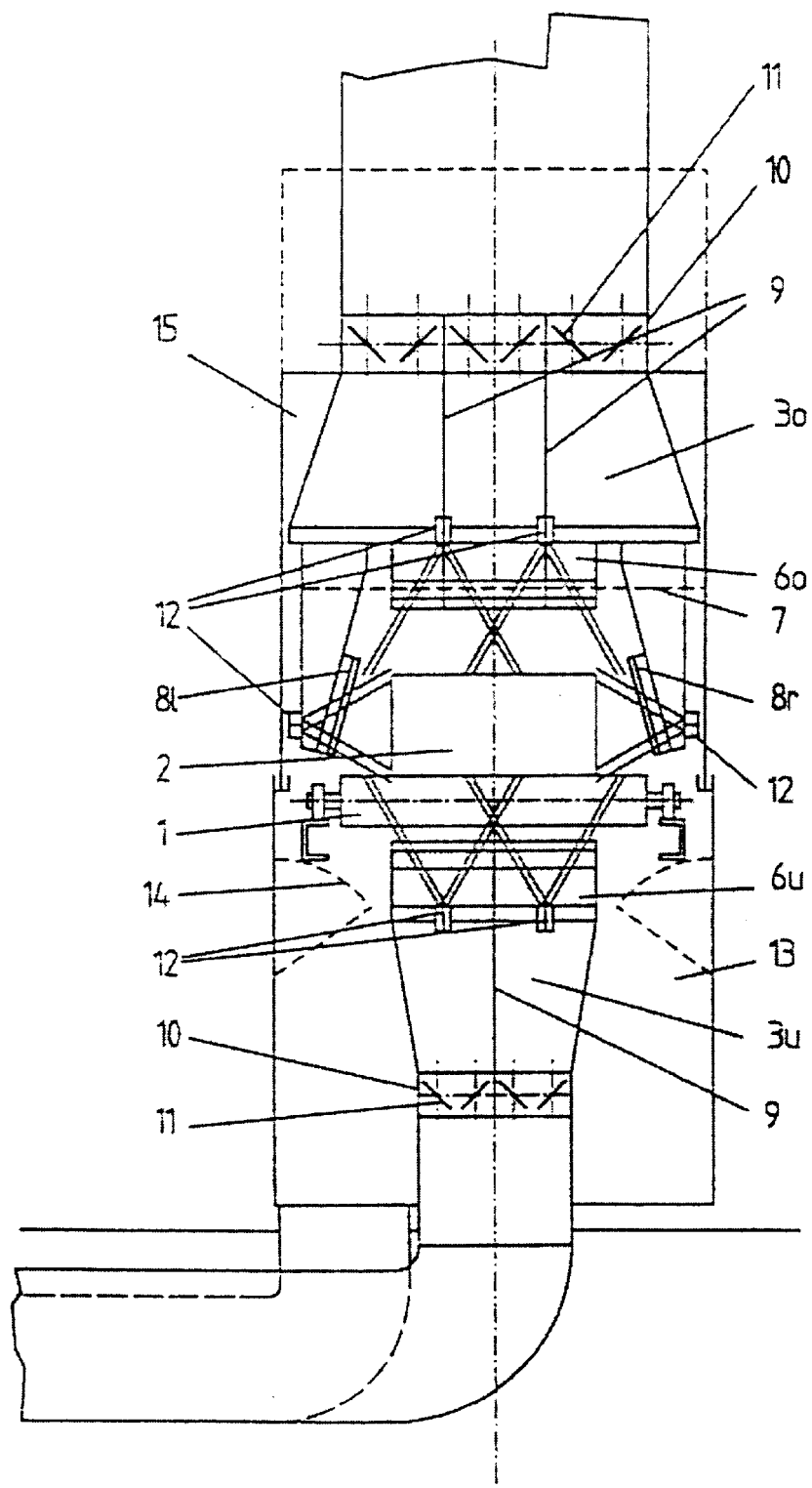

The invention will now be detailed by way of a typical example embodiment and explained with reference to the FIGS. 1 and 2 in which FIG. 1 is a longitudinal view and FIG. 2 is a cross-section through the device in accordance with the invention.

Shown in the Figs. is merely one section of the apparatus. When the cooling task to be satisfied by the apparatus requires, a corresponding plurality of such sections is arranged in-line, wherein generally only the first section, as shown in the Figs., is operated as both an air cooling section and as a water cooling section.

On a transport means, which is to advantage a rollway (1), the extruded profile (2) represented in FIGS. 1 and 2 by the envelope of the maximum cross-section of the extruded profile is guided through the apparatus, although, of course, instead of the rollway a ladder-like arrangement of slider blocks of a suitable material e.g. graphite may also be used. Arranged above and below the rollway is an upper nozzle header (3o) and a lower nozzle header (3u) respectively. By means of adjustment aids (not shown) the lower nozzle header may be adjusted to comply with the rollway which is adjustable to the runout level of the profile by usual ways and means. In FIG. 1 this possibility of making the adjustment is indicated by the double arrows (4). The upper nozzle header is provided with a quick lifting device likewise indicated in FIG. 1 simply by the double arrows (5); the quick lifting which is effected with the aid of corresponding synchronized hydraulic cylinders. These are likewise not shown in the Fig. since such quick lifting devices are sufficiently known from other technical applications.

The nozzle headers for air cooling (3o) and (3u) carry horizontal banks of slotted nozzles (6o) and (6u), the upper bank of nozzles (6o) being arranged in the region of the rollers or slats of the transport means with the lower bank of nozzles (6u) in between. In addition to the banks of slotted nozzles the upper nozzle header (3o) is equipped with nozzle arms (7) located and oriented downwards on both sides of the profile (2). Through these nozzle arms likewise provided with slotted nozzles (8) cooling air is blown onto the vertical side surface areas of the profile. The upper slotted nozzles (6o), the side slotted nozzles (8r) and (8l) as well as the lower slotted nozzles (6u) are arranged relative to each other such that their center planes have practically the same spacing away from each of the adjustment slotted nozzles so that as a result the slotted jets do not penetrate each other in the cooling region in which the profile (2) is located. It is in this way namely that all slotted jets impinge on and "wash" the extruded profile to be cooled uniformly on all sides, it being in keeping with this boundary condition that any arrangement of air nozzles may be selected relative to each other both in design and production.

For adapting the air cooling effect to the extruded profile in each case the air flow on the inflow side to the nozzles is zoned parallel to the direction of extrusion. These zones are separated by partitioning metal plates or sheets (9). These partitioning plates are continued up to the connecting port (10) and subdivide this into sections in each of which a throttle or flow reduction means is incorporated. One advantageous embodiment of such a flow reduction means is e.g. an arrangement of counter-adjustable flaps or valves (11) with the aid of which the jetting velocity of the slotted air nozzles is adaptable over a broad range to each situation as dictated by the mass or wall thickness distribution of the extruded profile.

For water cooling water tubes (12) are provided, running in the direction of extrusion. Evident from FIG. 2, showing a cross-section through the apparatus in accordance with the invention, two water tubes are provided each above and below and one water tube on each side of the extruded profile. Where cooling devices are needed for extruded profiles wider and/or higher in cross-section the number of the tubes arranged above and below as well as on the sides of the extruded profile is adapted accordingly. Expediently these tubes are configured as double tubes which, as evident from FIG. 2, may be configured by arranging two rectangular tubes juxtaposed. These tubes are equipped with nozzles—expediently flat jetting nozzles—arranged so that their spray patterns, as evident in the cross-section of the device as shown in FIG. 2 overlap such that the periphery of the extruded profile receives a uniform impingement of water. This water impingement may be reduced by switching off one of the two tubes. Another possibility of reducing the water impingement density as a whole is to vary the pumping pressure by changing the pressure or speed of the pump. The nozzles are arranged in the water spray tubes in keeping with the pitch of the air nozzles. This pitch depends on the minimum extrusion rate and is selected such that over the pitch length, i.e. between the impingement areas of two nozzles, no return heating can take place in the extruded profile due to heat being conducted from the core of the material which, for metallurgical reasons is not allowable.

Since the cooling effect with water is substantially higher than with air it is expedient to provide in one section of an air cooling at least two sections with water cooling. This is made simply possible by the longitudinally extending water tubes fitted with nozzles being separated at corresponding positions in the apparatus and provided in each case with a separate supply, where possible, from a separate pump. In this way the water impingement may also be varied over the length of the profiles in the cooling device, it thus being possible, e.g. to provide weaker cooling in the first region of the cooling, where the profile is particularly sensitive, since it will still tend to deform plastically at corresponding temperatures, and not to provide a stronger cooling until the modulus of elasticity of the material has again approached the modulus of elasticity at ambient temperature, due to the progress in cooling, and any deformation due to non-homogenous cooling occurring elastically, i.e. again disappears following the temperature compensation in the profile.

To permit operation both with water and air the lower air header is integrated in a water catchment tank (13). This water catchment tank may be expediently equipped with flaps or valves (14) which preclude any excessively intensive jetting of the water surface during air cooling whilst permitting a substantially unobstructed exit flow of the cooling air. To avoid water spray in the upper region of profile cooling the upper nozzle system is provided with a shroud (15) which is lowered out of the way when water cooling is in operation and lifted during air cooling operation. It is thus possible with the apparatus in accordance with the invention to work both with air and water without involving appreciable adjustments, which in addition to this may also be made automatically, and to cover the complete cooling range from moderate air cooling via intensive air cooling up to highly intensive water cooling.

What is claimed is:

1. An apparatus for cooling an extruded profile that moves on an exit runway along an extruded profile path, comprising:

slotted air nozzles arranged above and below the extruded profile path and oriented transversely to the direction of movement of the profile, and water impingement nozzles for impinging the extruded profile with water, separate from said air nozzles, and wherein said water impingement nozzles are arranged in tubes oriented in the direction of movement of the profile such that the impingement regions of the individual water impingement nozzles supplement each other to achieve a homogenous impingement of the profile, said air nozzles are slotted air nozzles providing cooling of the extruded profile over substantially the full length of the apparatus, and the said slotted air nozzles and said water impingement nozzles can be operated independently of one another to effect cooling of the profile.

2. The apparatus as set forth in claim 1, wherein the tubes are arranged above, below and on the side of the extruded profile path.

3. The apparatus as set forth in claim 1, characterized in that means are provided for adapting air jetting and/or water impingement to the cooling rate of the profile required in each case, the means being preferably automatically controlled.

4. The apparatus as set forth in claim 1, wherein the slotted air nozzles include upper slotted air nozzles which in turn include side located slotted air nozzles arranged on both sides of the extruded profile path.

5. The apparatus as set forth in claim 1, wherein the supply to the slotted air nozzles is zoned in sections oriented in the longitudinal direction of the apparatus and these zones are continued up to an air supply port provided in the zoned region with flow reducing devices for adjusting the strength of the air flow into each of the zoned sections.

6. The apparatus as set forth in claim 5, wherein an upper nozzle header including the upper slotted air nozzles is sectioned into at least three sections and a lower nozzle header including the lower slotted air nozzles is sectioned into at least two sections.

7. The apparatus as set forth in claim 1, wherein the water tubes included side-by-side tubes.

8. The apparatus as set forth in claim 1, wherein the water tubes oriented in the longitudinal direction of the apparatus and fitted with spray nozzles may be individually switched ON/OFF.

9. The apparatus as set forth in claim 1, wherein several sections of said apparatus are arranged in sequence, one or more sections being equipped with slotted air nozzles as well as water impingement nozzles and one or more sections being exclusively equipped with slotted air nozzles.

10. The apparatus as set forth in claim 1, wherein an air cooling section of the apparatus is sectioned into at least two water cooling sections, the individual water cooling sections being provided with a water supply at a separate adjustable supply pressure and each comprising water tubes, each of which is separately switchable, oriented in the longitudinal direction of the apparatus and provided with spray nozzles.

11. The apparatus as set forth in claim 1, wherein flat spray nozzles are employed as water impingement nozzles.

12. The apparatus as set forth in claim 1, wherein its lower portion is integrated into a water catchment tank provided with exit flow valves to be opened during an air cooling operation, further characterized in that its upper portion is surrounded by a shroud for splash protection which may be raised during an air cooling operation to prevent obstruction of the exit flow of cooling air.

13. The apparatus as set forth in claim 6, wherein the upper slotted air nozzles include side located slotted air nozzles arranged on both sides of the extruded profile path, and said flow reducing devices are arranged to provide for separate adjustment of the jetting strength of the side located slotted air nozzles.

14. An apparatus for cooling an extruded profile that moves on an exit runway along an extruded profile path, comprising:

slotted air nozzles arranged above and below the extruded profile path and oriented transversely to the direction of movement of the profile, and water impingement nozzles for impinging the extruded profile with water, and wherein said water impingement nozzles are arranged separately from the slotted air nozzles in tubes oriented in the direction of movement of the profile such that the impingement regions of the individual water impingement nozzles supplement each other to achieve a homogenous impingement of the profile, and several sections of said apparatus are arranged in sequence, one or more sections being equipped with slotted air nozzles as well as water impingement nozzles and one or more sections being exclusively equipped with slotted air nozzles.

15. An apparatus for cooling an extruded profile that moves on an exit runway along an extruded profile path, comprising:

slotted air nozzles arranged above and below the extruded profile path and oriented transversely to the direction of movement of the profile, and water impingement nozzles for impinging the extruded profile with water, and wherein said water impingement nozzles are arranged separately from the slotted air nozzles in tubes oriented in the direction of movement of the profile such that the impingement regions of the individual water impingement nozzles supplement each other to achieve a homogenous impingement of the profile, and a lower portion of the apparatus is integrated into a water catchment tank provided with exit flow valves to be opened during an air cooling operation, further characterized in that its upper portion is surrounded by a shroud for splash protection which may be raised during an air cooling operation to prevent obstruction of the exit flow of cooling air.

* * * * *